(12) United States Patent
Shiell et al.

(10) Patent No.: US 8,311,319 B2
(45) Date of Patent: Nov. 13, 2012

(54) L1-OPTIMIZED AAM ALIGNMENT

(75) Inventors: Derek Shiell, Los Angeles, CA (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 170 days.

(21) Appl. No.: 12/961,347

(22) Filed: Dec. 6, 2010

(65) Prior Publication Data
US 2012/0141018 A1    Jun. 7, 2012

(51) Int. Cl.
*G06K 9/00* (2006.01)
*G06T 17/00* (2006.01)
*G06F 15/18* (2006.01)

(52) U.S. Cl. ............ 382/159; 345/420; 706/12

(58) Field of Classification Search ........ 382/115, 382/155, 157, 159, 181; 348/169, 267; 345/420, 345/621, 630; 700/96; 701/59; 706/12, 706/25
See application file for complete search history.

(56) References Cited

U.S. PATENT DOCUMENTS
7,720,284 B2 * 5/2010 Zhang et al. ............ 382/173
8,224,039 B2 * 7/2012 Ionita et al. ............ 382/118

OTHER PUBLICATIONS

Huang, L., et al., "Bayesian Network Enhanced Prediction for Multiple Facial Feature Tracking", Computer Vision Center, Electronic Letters on Computer Vision and Image Analysis 5(3):pp. 157-169, 2005.
Saragih, J., et al., "Iterative Error Bound Minimisation for AAM Alignment", ICPR 2006, Hong Kong, Aug. 20-23, 2006.
Larsen, R., et al., "Q-MAF Shape Decomposition" Springer-Verlag, In MICCAI 2001, 4th International Conference, pp. 837-844, 2001.
Ki, S., et al., "Reliable Face Alignment Using Two-Stage AAM", World Academy of Science, Engineering and Technology 41, pp. 91-95, 2008.

* cited by examiner

*Primary Examiner* — Abolfazl Tabatabai
(74) *Attorney, Agent, or Firm* — Rosalio Haro

(57) ABSTRACT

An Active Appearance Model, AAM, uses an $L_1$ minimization-based approach to aligning an input test image. In each iterative application of its statistical model fitting function, a shape parameter coefficient p and an appearance parameter coefficient $\lambda$ within the statistical model fitting function are updated by $L_1$ minimization. The AAM further includes a canonical classifier to determine if an aligned image is a true example of the class of object being sought before the AAM is permitted to output its aligned image.

25 Claims, 10 Drawing Sheets

L1-OPTIMIZED AAM ALIGNMENT

BACKGROUND

1. Field of Invention

The present invention relates to an active appearance model, AAM, machine and method. More specifically, it relates to an AAM with more robust and accurate image alignment capabilities.

2. Description of Related Art

In the field of computer vision, it is generally desirable that an image not only be captured, but that the computer be able to identify and label various features within the captured image. Basically, a goal of computer vision is for the computer to "understand" the contents of a captured image.

Various approaches to identifying features within a captured image are known in the industry. Many early approaches centered on the concept of identifying shapes. For example, if a goal was to identify a specific item, such as wrench or a type of wrench, then a library of the different types of acceptable wrenches (i.e. examples of "true" wrenches) would be created. The outline shapes of the true wrenches would be stored, and a search for the acceptable shapes would be conducted on a captured image. This approach of shape searching was successful when one had an exhaustive library of acceptable shapes, the library was not overly large, and the subject of the captured images did not deviate from the predefined true shapes.

For complex searches, however, this approach is not effective. The limitations of this approach become readily apparent when the subject being sought within an image is not static, but is prone to change. For example, a human face has definite characteristics, but does not have an easily definable number of shapes and/or appearance it may adopt. It is to be understood that the term appearance is herein used to refer to color and/or light differences across an object, as well as other surface/texture variances. The difficulties in understanding a human face becomes even more acute when one considers that it is prone to shape distortion and/or change in appearance within the normal course of human life due to changes in emotion, expression, speech, age, etc. It is self-apparent that compiling an exhaustive library of human faces and their many variations is a practical impossibility.

Recent developments in image recognition of objects that change their shape and appearance, such as the human face, are discussed in "Statistical Models of Appearance for Computer Vision", by T. F. Cootes and C. J. Taylor (hereinafter Cootes et al.), Imaging Science and Biomedical Engineering, University of Manchester, Manchester M13 9PT, U.K. email: t.cootes@man.ac.uk, http://www.isbe.man.ac.uk, Mar. 8, 2004, which is hereby incorporated in its entirety by reference.

As Cootes et al explain, in order for a machine to be able to understand what it "sees", it must make use of models that describe and label the expected structure being imaged. In the past, model-based vision has been applied successfully to images of man-made objects, but their use has proven more difficult in interpreting images of natural subjects, which tend to be complex and variable. The main problem is the variability of the subject being examined. To be useful, a model needs to be specific, that is, it should represent only true examples of the modeled subject. The model, however, also needs to be general and represent any plausible example (i.e. any possible true example) of the class of object it represents.

Recent developments have shown that this apparent contradiction can be handled by statistical models that can capture specific patterns of variability in shape and appearance. It has further been shown that these statistical models can be used directly in image interpretation.

To facilitate the application of statically models, subjects to be interpreted are typically separated into classes. This permits the statistical analysis to use prior knowledge of the characteristics of a particular class to facilitate its identification and labeling, and even to overcome confusion caused by structural complexity, noise, or missing data.

Additionally, in order to facilitate further processing of identified and labeled subjects within a captured image, it is beneficial for the identified subject to be transformed into (i.e. be fitted onto) a predefined, "model" shape with predefined locations for labeled items. For example, although the human face may take many shapes and sizes, it can be conformed to a standard shape and size. Once conformed to the standard shape and size, the transformed face can then be further processed to determine its expression, determine its gaze direction, identify the individual to whom the face belongs, etc.

A method that uses this type of alignment is the active shape model. With reference to FIG. 1, the active shape model uses a predefined model face 1A and a list of predefined deformation parameters, each having corresponding deformation constraints, to permit the model face to be stretched and move to attempt to align it with a subject image 2. Alternatively, the list of predefined deformation parameters may be applied to subject image 2, and have it be moved and deformed to attempt to align it with model face 1. This alternate approach has the added benefit that once subject image 2 has been aligned with model face 1, it will also be fitted to the shape and size of model face 1.

For illustrative purposes, FIG. 1 shows model face 1A being fitted to subject face 2. The example of FIG. 1 is an exaggerated case for illustration purposes. It is to be understood that a typical model face 1A would have constraints regarding its permissible deformation points relative to other points within itself. For example, if aligning the model face meant moving its left eye up one inch and moving its right eye down one inch, then the resultant aligned image would likely not be a human face, and thus such a deformation would typically not be permissible.

In the example of FIG. 1, the model face is first placed roughly within the proximity of predefined points of interest, and typically placed near the center subject face 2, as illustrated in image 3. By comparing the amount of misalignment resulting from moving model face 1A in one direction or another, and the results of adjusting a size multiplier in any of several predefined directions, one can determine how to better align model face 1, as illustrated in image 4. An objective would be to align as closely as possible predefined landmarks, such as the pupils, nostril, mouth corners, etc., as illustrated in image 5. Eventually, after a sufficient number of such landmark points have been aligned, the subject image 2 is warped onto model image 1A resulting in a fitted image 6 with easily identifiable and labeled points of interest that can be further processed to achieve specific objectives.

This approach, however, does not take into account changes in appearance, i.e. shadow, color, or texture variations for example. A more holistic, or global, approach that jointly considers the object's shape and appearance is the Active Appearance Model (AAM). Although Cootes et al. appear to focus primarily on the gray-level (or shade) feature of appearance, they do describe a basic principle that AAM searches for the best alignment of a model face (including both model shape parameters and model appearance parameters) onto a subject face while simultaneously minimizing misalignments in shape and appearance. In other words, AAM applies knowledge of the expected shapes of structures, their spatial relationships, and their gray-level appearance (or more generally color value appearance, such as RGB values) to restrict an automated system to plausible interpretations. Ideally, AAM is able to generate realistic images of sought objects. An example would be a model face capable of generating convincing images of any individual, changing their expression and so on. AAM thus formulates interpretation as a matching problem: given an image to interpret, structures are located and labeled by adjusting the model's parameters in such a way that it generates an 'imagined image' that is as similar as possible to the real thing.

Although AAM is a useful approach, implementation of AAM still poses several challenges. For example, as long as the AAM machines manages to find a "fit" within its defined parameters, it will assume that a plausible match, or fit, has been found, but there is no guarantee that the closes match within its defined parameters is in fact a true example.

In other words, even if an AAM machine appears to have aligned a subject input image with a model image, the resulting aligned image may not necessarily be a true representation of the subject category. For example, if the initial position of the model image is too far misaligned from the subject input image, the model image may be aligned incorrectly on the subject input image. This would result in a distorted, untrue, representation of the warped output image.

Other limitations of an AAM machine results from the application of statistical analysis of a library of true samples to define distinguishing parameters and the parameter's permissible distortions. By the nature of the statistical analysis, the results will permit alignment only with a fraction of the true samples. If the subject category is prone to a wide range of changes, the model may not be able to properly align itself to an input subject image with characteristics beyond the norm defined by the shape or appearance model. This is true of even sample images within the library from which the model image (i.e. the shape or appearance model) is constructed. Typically, the constructed model image will be capable of being aligned to only 90% to 95% of the true sample images within the library.

SUMMARY OF INVENTION

It is an object of the present invention to provide improvements to an AAM that improves the robustness of its alignment of an input image and its model image.

It is a further object of the present invention to improve the reliability an AAM to output only true representations of a class of object.

The above objects are met in an Active Appearance Model (AAM) machine, having a learn module providing a model image of a class of object, the model image being created by combining feature information from an image library of true image samples of the class of object, the learn module further providing a statistical model fitting function defining shape and appearance features of the class of object; an input for receiving an input image; and an align module optimizing the statistical model fitting function to determine a best fit of the model image and the input image through iterative applications of the statistical model fitting function to produce an aligned image; wherein in each of the iterative applications, a shape parameter coefficients p and an appearance parameter coefficients λ within the statistical model fitting function are updated by $L_1$ minimization, and the $L_1$ minimization is defined as:

$$\min_{\Delta p, \Delta \lambda} \left\| A\lambda + [SD \ A] C(\lambda) \begin{bmatrix} \Delta p \\ \Delta \lambda \end{bmatrix} \Delta p - I(p) \right\|_1$$

wherein A=appearance base (i.e. current appearance of the model image within a current iteration), SD=a steepest descent matrix for shape coefficients, C(λ)=coefficient matrix dependent on current appearance parameters, Δp=update in the shape projection coefficients, Δλ=update in the appearance projection coefficients, and I(p)=appearance extracted from the input image based on current shape parameters within a current iteration.

In this Active Appearance Model machine, the appearance basis A is preferably comprised of eigenvectors, and A is also computed by $L_1$-decomposition.

Further preferably, the class of object is a human face class.

Additionally, the Active Appearance Model machine includes a canonical class classifier to determine if the aligned image is a true representation of the class of object, and an output for outputting the fitted image only if the canonical class classifier determines that the fitted image is a true representation of the class of object.

In this case, the canonical classifier would preferably have access to a library of fitted images (i.e. a library of previously aligned faces), and is trained using the library of fitted images, the library of fitted images being comprised of a positive training set of true fitted images and a negative training set of untrue fitted images. Additionally, the positive training set is comprised of manually verified true images output from the align module as a result of submitting the image library of true image samples of the class of object to the align module. Preferably, the negative training set is comprised of object images from the positive training set to which perturbations have been introduced, wherein the perturbations do not affect the size or perimeter outline of the object images.

Further preferably, the fitted images within the positive training set and negative training set have characteristic features of the class of object manually identified and demarcated. Like before, the size and perimeter outline of the fitted images within the positive training set and negative training set is the same as the size and perimeter outline of the model image.

It is currently preferred that the untrue fitted images be constructed from the true fitted images by introducing perturbations related to eigenvalues within the statistical model.

In the embodiment that includes a canonical classifier, the untrue fitted images may be constructed from the true fitted images by applying predefined translation, scale, and rotation offsets to the true fitted images, the scale offsets not affecting the size or perimeter outline of the true fitted images. Furthermore, the number of untrue fitted images in the negative training set is preferably greater than then number of true fitted images in the positive training set. More specifically, there is a 10:1 ratio in the number of images in the negative training set to the number of images in the positive training set.

The present objects are also met in an Active Appearance Model machine, having a learn module providing a model image of a class of object, the model image being created by combining feature information from an image library of true image samples of the class of object, the learn module further providing a statistical model fitting function defining shape and appearance features of the class of object; an input for receiving an input image; an align module optimizing the statistical model fitting function to determine a best fit of the model image and the input image through iterative applications of the statistical model fitting function to produce an aligned image; canonical class classifier to determine if the aligned image is a true representation of the class of object; and an output for outputting the aligned image only if the canonical class classifier determines that the aligned image is a true representation of the class of object.

In this Active Appearance Model machine, it is preferred that the canonical classifier have access to a library of fitted images (i.e. a library of previously aligned faces), and that it be trained using the library of fitted images, the library of fitted images consisting of a positive training set of true fitted images and a negative training set of untrue fitted images. Further preferably, the positive training set consists of manually verified true images output from the align module as a result of submitting the image library of true image samples of the class of object to the align module. In this case, the negative training set may be comprised of object images from the positive training set to which perturbations have been introduced, and the perturbations do not affect the size or perimeter outline of the object images.

Preferably, the fitted images within the positive training set and negative training set have characteristic features of the class of object manually identified and demarcated. Additionally, the size and perimeter outline of the fitted images within the positive training set and negative training set are preferably the same as the size and perimeter outline of the model image.

In a preferred embodiment, the untrue fitted images are constructed from the true fitted images by introducing perturbations related to eigenvalues within the statistical model.

In another preferred embodiment, the untrue fitted images are constructed from the true fitted images by applying predefined translation, scale, and rotation offsets to the true fitted images, the scale offsets not affecting the size or perimeter outline of the true fitted images.

Preferably, there is a 10:1 ratio in the number of images in the negative training set to the number of images in the positive training set.

Additionally, in the present Active appearance Model machine of claim 14, the align module applies $L_1$ minimization to compute parameter updates for the statistical model fitting function; and in each of the iterative applications, a shape parameter coefficients p and an appearance parameter coefficients λ are updated, and the $L_1$ minimization is defined as:

$$\min_{\Delta p, \Delta \lambda} \left| A\lambda + [SD \ A]C(\lambda) \begin{bmatrix} \Delta p \\ \Delta \lambda \end{bmatrix} \Delta p - I(p) \right|_{l_1}$$

wherein A=appearance base (i.e. current appearance of the model image within a current iteration); SD=a steepest descent matrix for shape coefficients; C(λ)=coefficient matrix dependent on current appearance parameters; Δp=update in the shape projection coefficients; Δλ=update in the appearance projection coefficients; and I(p)=appearance extracted from the input image based on current shape parameters. In this case, the appearance basis A is computed by $L_1$-decomposition.

In the presently preferred embodiment, the class of object is a human face.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

Before an Active Appearance Model machine (AAM) may be used, it must first be trained to recognize a specific class of objects. For illustrative purposes, the following discussion will focus on an AAM designed to recognize specific features of a human face.

Figure 1:
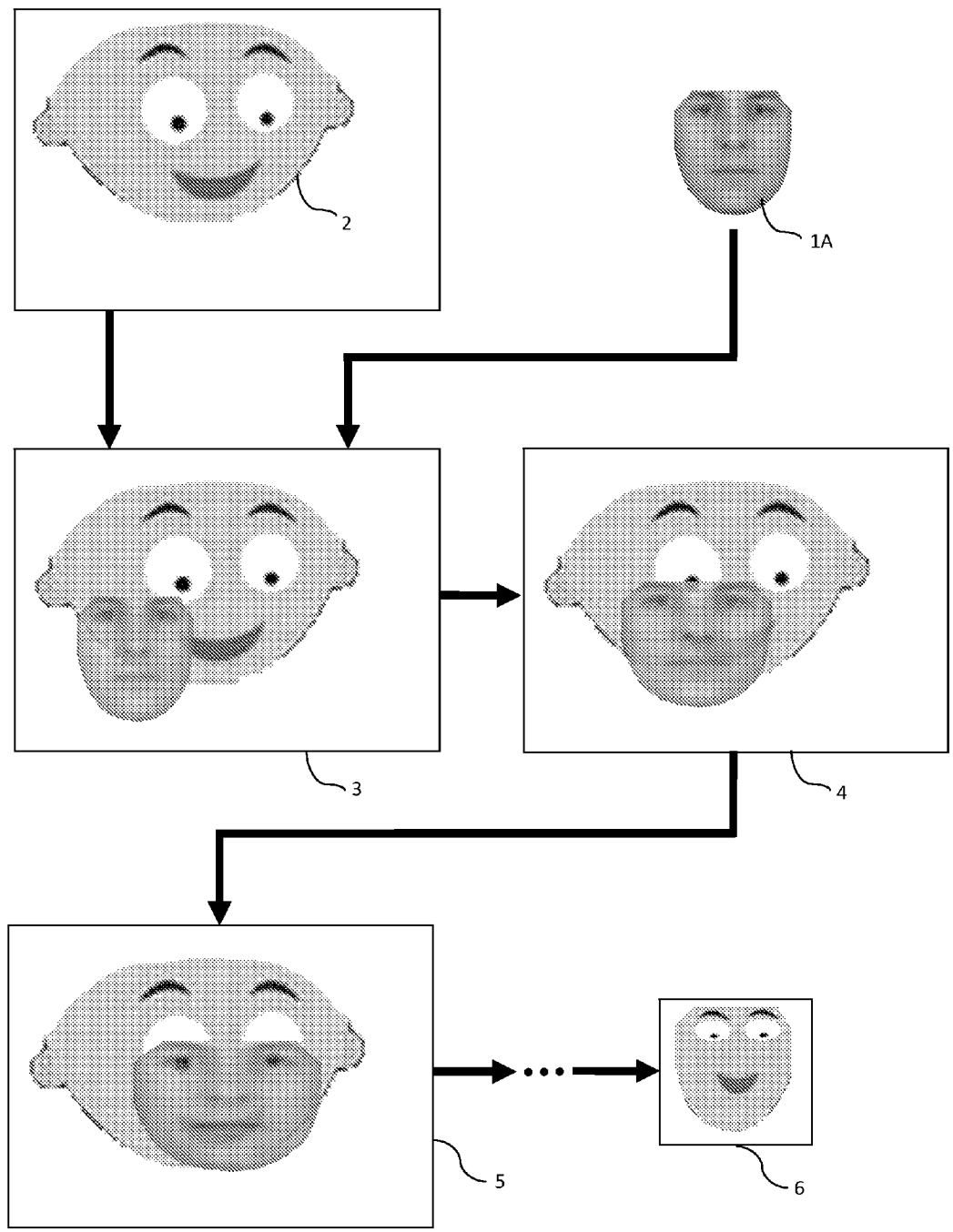
FIG. 1 shows an example of a fitting operation to fit a model face to an input face.
Figure 2:
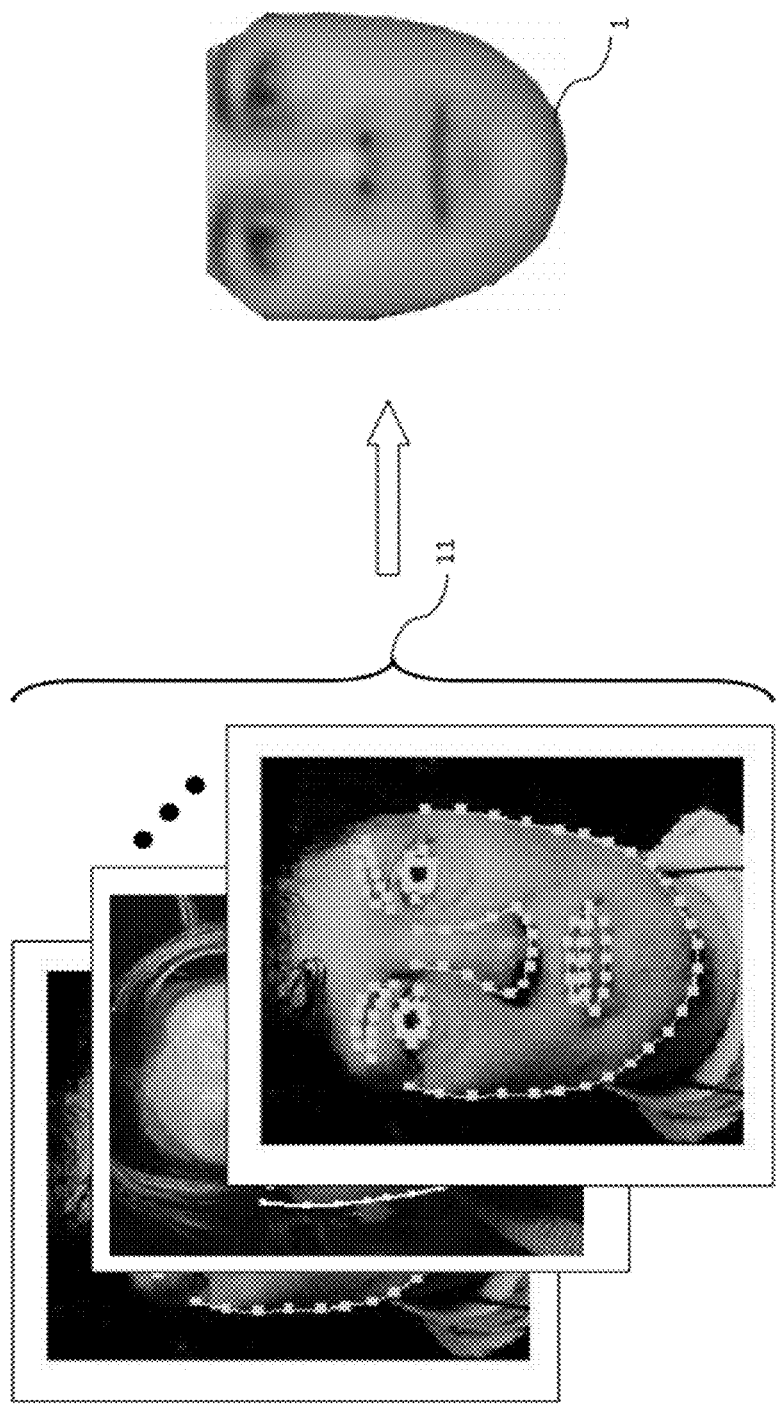
FIG. 2 illustrates the combining of a library of training images in the construction of a model face.

With reference to FIG. 2, a model face 1 may be constructed from a library of training images 11 (i.e. true faces images, in the present example). Typically, a user manually places "landmark" points on each training image to outline specific features characteristic to the class of object being represented. The landmark points are ideally selected in such a way that the landmark points outline distinguishable features within the class common to every training image. For instance, a common feature within a face class may be the eyes, and when building a model of the appearance of an eye in a face image, landmark points may be placed at the corners of the eye since these features would be easy to identify in each training image. In addition to the landmark points, however, AAM 25 also makes use of appearance data (i.e. shade data and/or color data and/or texture data, etc.) at various patches of each training image to create a distribution range of acceptable appearances for corresponding patches within model face 1. This appearance data constitutes additional features in the overall statistical analysis.

Figure 3:
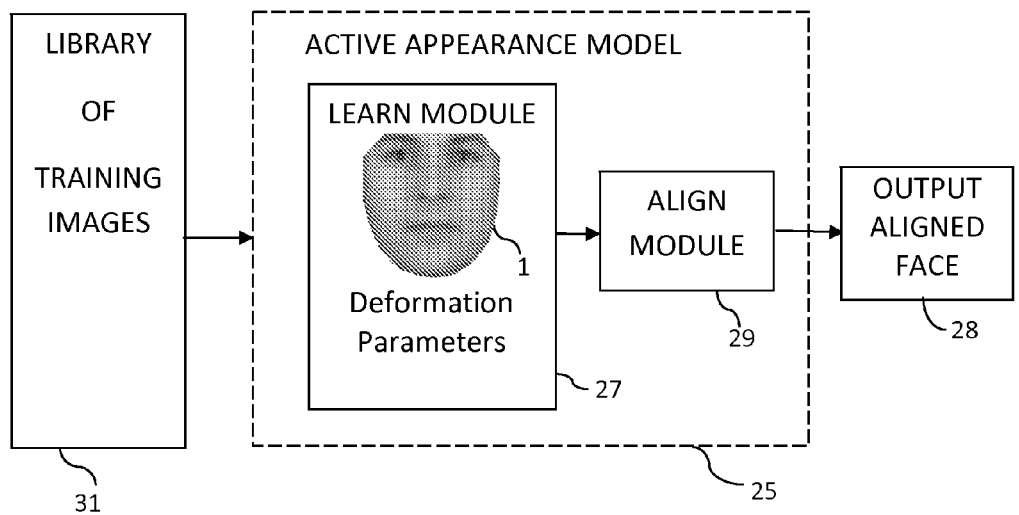
FIG. 3 illustrates the structure of an Active Appearance Model (AAM) machine with access to a library of training images for training purposes.

With reference to FIG. 3, an active appearance model machine, AAM, 25 in the training phase would have access to a library 31 of training images, each being an example of a given class of object. In the present example, it is assumed that AAM 25 is being trained to identify a human face class, and thus library 31 would consist of a plurality of true face training images, each having landmark points outlining characteristic features of the human face class, such as training images 11 of FIG. 2. Library 31 may be housed in an internal and/or external memory store.

It is to be understood that AAM machine 25 may be embodied by a computing device and/or data processing device. As it is generally known in the art, such computing devices and data processing devices may include one or more central processing units, arithmetic units, registers, clocks, memories, input/output interfaces, GPU's, ASICs, PLA's, FPLAs, buses, bus interfaces, network connections, controllers, input/output devices, displays, etc.

AAM 25 includes a learn module 27 and an align module 29. Learn module 27 goes through library 31 and using statistical analysis, creates model face 1 by combining information from the face training images within library 31 and defines deformation parameters (i.e. variable feature parameters with defined constraints) for a statistical model fitting function defining shape and appearance features of model face 1. Preferably, the deformation parameters are such that they permit the shape and appearance of model face 1 to be warped enough to be aligned with a large percentage of the training images within library 31. In operation, align module 29 optimizes the model fitting function to attempt to fit (i.e. warp or align) model face 1 to a test (or input) face, not shown, and output the fitted face 28.

Align module 29 may also be used during the training phase as a way to test the results from learn module 27. In the training phase, align module 29 may be used to attempt to warp model face 1 onto all the training images within library 31. This would provide a measure of the effectiveness of the model parameters produced by learn module 27. Typically, align module 29 may successfully align model face 1 to only 90% to 95% of the training images within library 31.

Since align module 29 preferably adjusts the model face to align it with a test (or input) face, the resultant aligned face 28 is effectively a representation of the test image having been "warped" (or fitted) onto model face 1. Additionally, since the test face would have been fitted onto the model face, the resultant aligned face 28 would have the same, known size as model face 1, and have its various characteristic shape features (i.e. eyes, pupils, nose, mouth outline, chine, eyebrow, etc.) and appearance features labeled (and their locations identified), and is thus in an ideal state for further processing, if desired.

As stated above, learn module 27 defines the deformation parameters for a statistical model used to fit model face 1 onto a test input image. An initial step in this process is typically to align the many training images within library 31 to establish a range of variation among the characteristic features of the training images. This process typically makes use of the sum of square distances. In other words, an $L_2$-norm approach is typically used to align the many training images within library 31 during the training phase. This may be roughly thought of as an averaging of the training images within library 31. The sum of square distances has the advantage of centering the training images so that variations in regions of interest are more equally spaced. An example of this $L_2$-norm approach is illustrated in FIG. 5 using oval shapes, 51-55.

Figure 5:
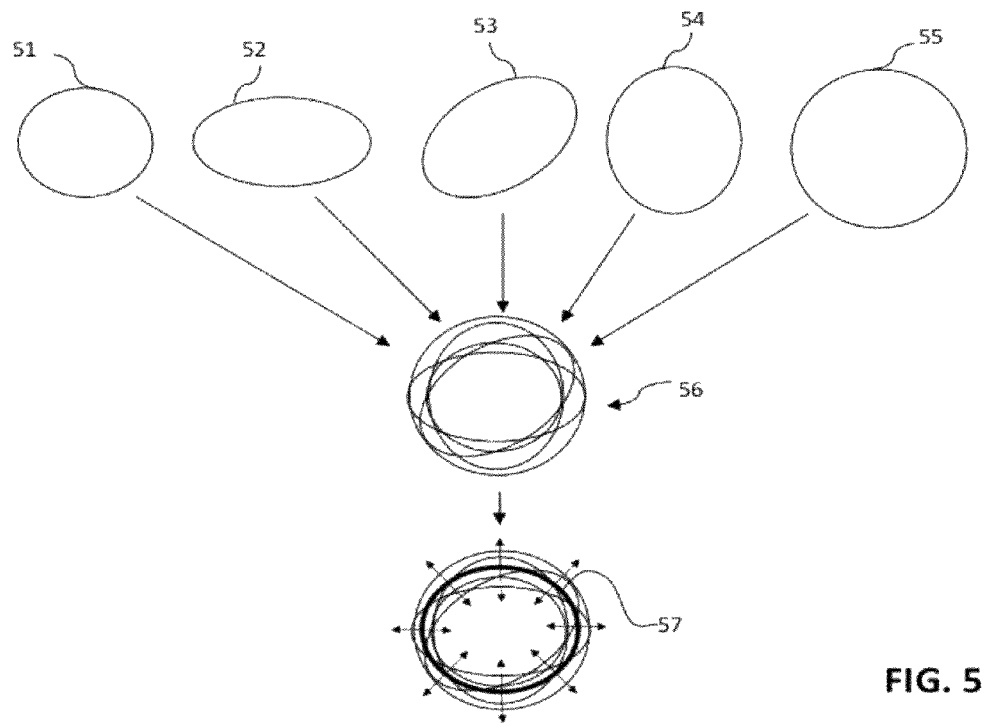
FIG. 5 illustrates the use of an $L_2$-norm approach toward combining multiple shapes.

With reference to FIG. 5, five oval shapes 51-55 are shown for illustrative purposes. Using an $L_2$-norm approach for shape alignment, such as the Procrustes analysis known in the art, effectively centers the ovals into a first cluster 56. An average shape 57 may then be defined. Double-headed arrows illustrate the variations of the different oval shapes 51-55 from the average shape 57.

Figure 6:
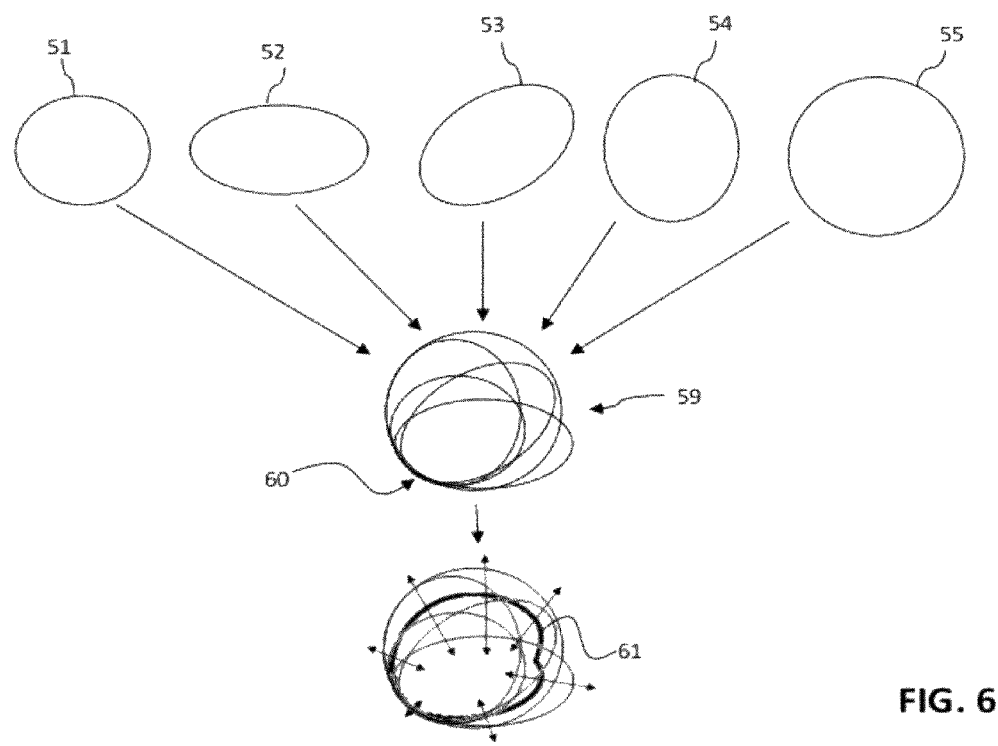
FIG. 6 illustrates the use of an $L_1$-norm approach toward combining multiple shapes.

For comparison purposes, FIG. 6 shows the same oval shapes 51-55, but this time oval shapes 51-55 are aligned using an $L_1$-norm approach. The $L_1$-norm approach attempts to align oval shapes 51-55 along a common edge. As a result, a second cluster 59 with a commonly aligned edge 60 is created. An average shape 61 defined using second cluster 59 is therefore less likely to have shape similar to those of the training shapes, i.e. oval shapes 51-55. Furthermore as is illustrated by the double-headed arrows within FIG. 6, the extremes in variation are likely to be far more pronounced than the approach of FIG. 5, and may ranging from very small variation to a very large variation.

Although not shown, it is to be understood that the averaging of appearance variations among the training images within library 31 may be similarly accomplished by Procrustes analysis.

Figure 4:
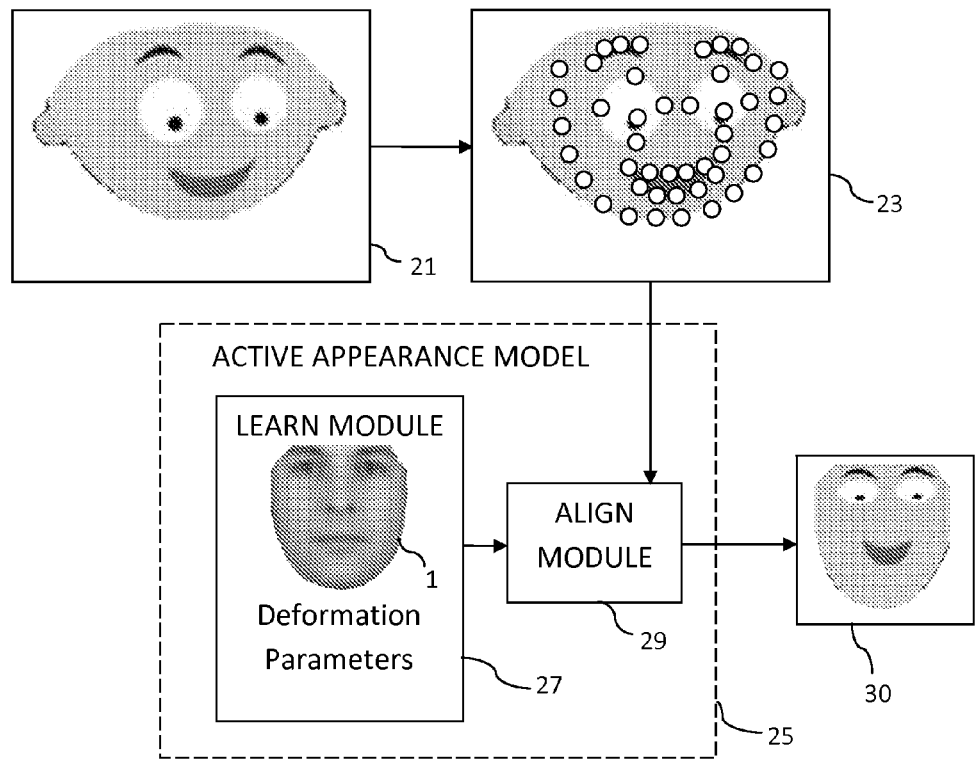
FIG. 4 illustrates an AAM during normal operation.

With reference to FIG. 4, where all elements similar to FIG. 3 have similar reference characters and are described above, the structure of a general AAM 25 in operation may exclude library 31. This is because the relevant image information from library 31 would have been captured by the statistical model (and model parameters) defined by learn module 27.

In operation, a new input image (or test image) 21 that is to be submitted to AAM 25 may optionally be preprocess to determined if an object within the class of objects AAM 25 is trained to recognize (i.e. a face in the present example) is indeed present within the input image 21. This may be achieved with face detection algorithms, as is generally known in the art. This process may also add at least a few landmark points at some of the more easily identifiable characteristic facial features within the input image to create a preprocessed image 23. Alignment module 29 would receive preprocessed image 23 (or alternatively input image 21) and optimize the model fitting function to attempt to align (i.e. warp or fit) model face 1 to preprocessed image 23, and output an aligned face 30. That is, alignment module 29 searches for the best alignment of model face 1 (including both shape and appearance parameters) onto the test image (i.e. input image 21 or preprocessed image 23) by simultaneously minimizing misalignments in shape and appearance.

Figure 7:
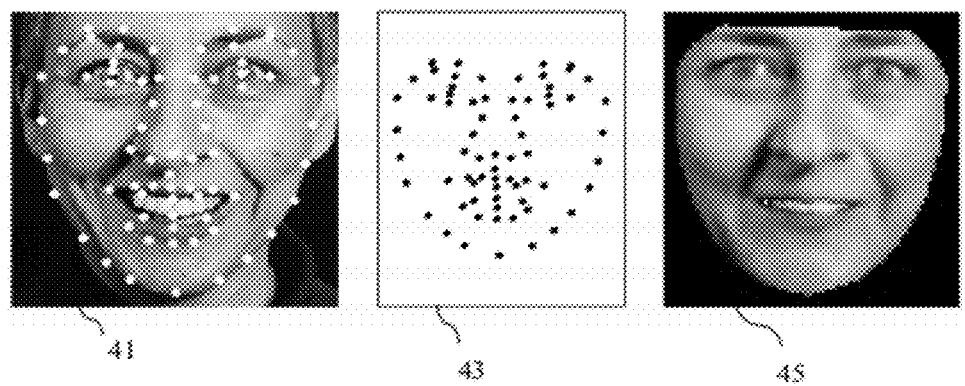
FIG. 7 illustrates an example of alignment of an input image to a model face.

An example of this type of alignment is illustrated in FIG. 7. A preprocessed image 41 is shown with various landmark points highlighting various characteristic features of a human face. Image 43 illustrates the landmark points alone, and image 45 illustrates the results of aligning a model face, not shown, onto image 41 as a result of alignment. Note that both shape and appearance features are aligned, i.e. fitted.

Figure 8:
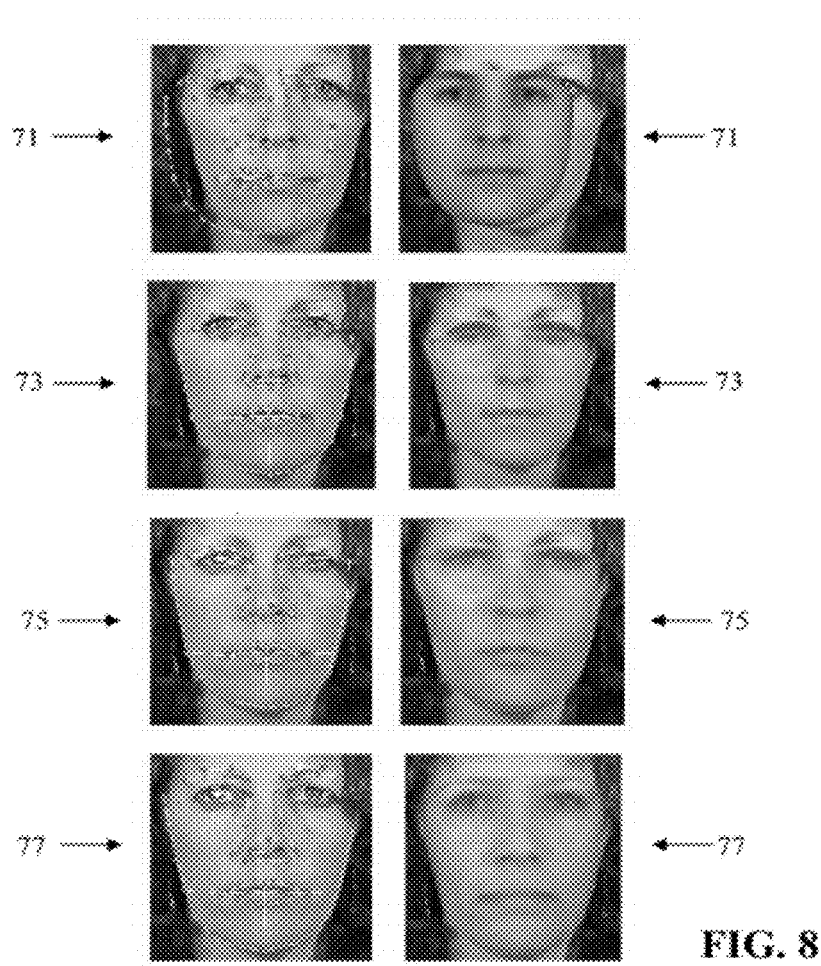
FIG. 8 illustrates some of the stages in an iterative process for aligning an input image to a model face.

As an additional example, four image pairs 71-77 illustrating various stages in an alignment process of a model face onto an input image are illustrated in FIG. 8. Within each image pair, the left image illustrates the model face shape alignment highlighted by landmark points, and the right image illustrates both the shape and appearance alignment of the model face onto the input image. Image pair 71 illustrates an initial position of the model face on the input image. Image pair 73 illustrates the result of an unconstrained AAM search. Image pair 75 shows the results of having the right eye center constrained, and image pair 77 shows the results of having the right eye center and left eyebrow fixed. As the error is minimized, the model face is better aligned to the input image, as illustrated by image pair 77.

A detailed explanation of the statistical optimization within the alignment process is beyond the scope of the present paper, but a quick overview is presented herein for reference purposes. The alignment process is an iterative process with small improvements in optimization obtained in each iteration. Typically, the iterative process ends when no further improvement, or no improvement greater than a predefined minimum threshold, can be achieved. Typically, alignment module 29 would use an $L_2$-norm approach for alignment.

If a shape is described by n points in d dimensions, then the shape may be represented by an nd element vector formed by concatenating the elements of the individual point position vectors. For instance, in a 2-dimensional (2-D) image, one can represent the n landmark points, {(xi,yi)}, for a single example as a 2n element vector, x, where x=(x1, ..., xn, y1, ..., yn). Given i training images, one would generate i such vectors. The sample images are then aligned, as described above. To simplify the problem, the dimensionality of the data is preferably reduced from nd to something more manageable. Typically, this is achieved by applying Principal Component Analysis (PCA) to the data. The data form a cloud of points in the nd-dimensional space. PCA computes the main axes of this cloud, allowing one to approximate any of the original points using a model with fewer than nd parameters. The result is a linear model of the shape variation of the object samples.

To create a complete image of an object or structure, both its shape and its appearance (i.e., the pattern of light intensity and/or color variation across the region of the object) need to be modeled. To build a statistical model of the appearance over an image patch, each training image is warped so that its control points match the mean shape (i.e. model face). This may be done using triangulation, as it is known in the art. The intensity information is then sampled from a shape-normalized image over the region covered by the mean shape to form an appearance vector.

Figure 9:
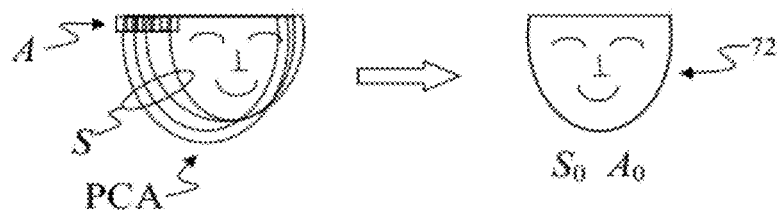
FIGS. 9 and 10 illustrate an alignment process by means of a statistical model fitting function.

For example in FIG. 9, $S_0$ and $A_0$ may define the shape and appearance of a model face 72. Through PCA, one may obtain S, a measure of shape variation, and T, a measure of appearance variation. A misalignment in shape S' may thus be defined as $S'=S-S_0$. Since PCA(S) produces an array of eigenvalues, this may be described as $P\lambda s$, where P is an eigenvector and $\lambda s$ is the projection coefficients. Using this notation, $S=S_0+P\lambda s$. Similarly, a misalignment in appearance T' may be defined as $T'=T-A_0$. Again, PCA(T') produces an array of eigenvalues, which may be described as $A\lambda a$, where A is an eigenvector and $\lambda a$ is the projection coefficients. Using this notation, $T=A_0+A\lambda a$.

Figure 10:
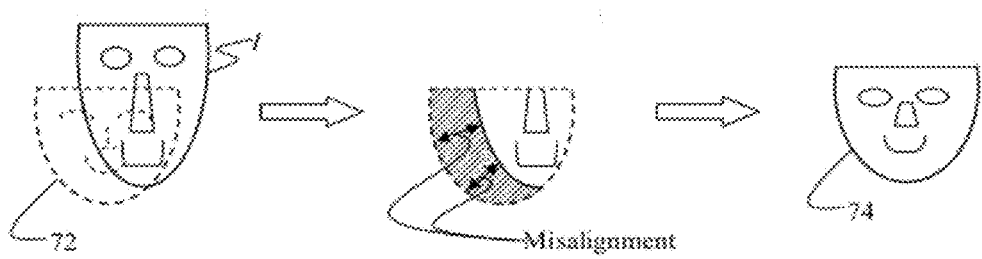

FIG. 10 illustrates an alignment process. Model face 72 is first placed on an input image I. The portion of the input image I that lies within the boundary of the model face 72 is identified, and the shape misalignment is defined by function W (I; p), where p are coefficients that correspond to eigenvectors in P. An alignment objective may then be defined as:

$$\min_{\lambda,p} \|(A_O + A\lambda) - W(I; p)\|$$

After multiple iterations, the alignment is optimized resulting in an aligned output face 74.

As stated above, to align a model face, one typically uses an $L_2$-norm approach. This is may be termed an $L_2$-AAM. Applicants have found, however, that a more robust alignment may be achieved using an $L_1$-norm approach, which is herein termed an $L_1$-AAM.

The objective is to use $L_1$ minimization to compute an AAM parameter update during each iteration. This is achieved by re-expressing the $L_2$ objective as an $L_1$ minimization problem. Each iteration updates a shape parameter p and an appearance parameter $\lambda$. A benefit of using an $L_1$-norm minimization approach is that the optimal solution will result in a sparse error vector $E=(A\lambda-I)$, where A is the appearance base (i.e. current iteration of the model face) and I is the input image (i.e. new input image or preprocessed input image) warped to the shape-normalized model, as it is known in the art.

An $L_2$-AAM may define its objective as:

$$\min_{\Delta p,\Delta\lambda} \left| A_O + A\lambda + [SD \quad A] C(\lambda) \begin{bmatrix} \Delta p \\ \Delta\lambda \end{bmatrix} \Delta p - I(p) \right|_{l_2}$$

This objective may be re-defined as an $L_1$-AAM, as follows:

$$\min_{\Delta p,\Delta\lambda} \left| A\lambda + [SD \quad A] C(\lambda) \begin{bmatrix} \Delta p \\ \Delta\lambda \end{bmatrix} \Delta p - I(p) \right|_{l_1}$$

where $A_O$=the mean appearance; $(A_O+A\lambda)$=the reconstruction of the face; SD=a steepest descent matrix for shape coefficients; A=appearance bases (eigenvectors); $C(\lambda)$=coefficient matrix dependent on current appearance parameters; p, $\Delta p$=shape projection coefficients and update; $\lambda$, $\Delta\lambda$=appearance projection coefficients and update; and I(p)= appearance extracted from image based on current shape parameters. In essence, the $L_1$-AAM minimizes with respect to the $L_1$-norm (i.e. $l_1$), whereas the $L_2$-AAM minimizes with respect to $L_2$-norm (i.e. $l_2$).

A basic difference between the two approaches is that the $L_2$-norm is robust to Gaussian noise, whereas the $L_1$-norm is robust to outlier noise. That is, the $L_1$-norm can handle occlusions and extraneous artifacts better. The Appearance bases, A, in the $L_1$-norm formulation should ideally be computed by $L_1$-decomposition of training data.

To reiterate some of the benefits of the present $L_1$-AAM machine, the solution to the $L_1$-AAM minimizer finds a sparser solution than the $L_2$-norm. Consequently, the solution, x, to $$\min_{x} |y - Ax|_{l_1}$$

should result in a sparse error, $E=y-Ax$. Additionally, in order to improve the performance, the appearance basis should be computed by $L_1$-decomposition.

Figure 12A:
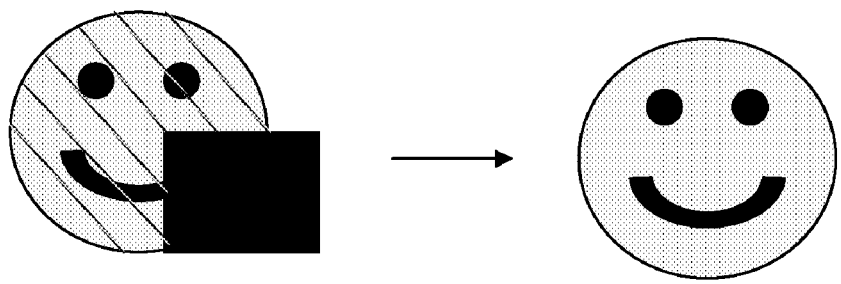
FIGS. 12A-12C illustrates some advantages of an $L_1$-AAM machine.
Figure 12B:
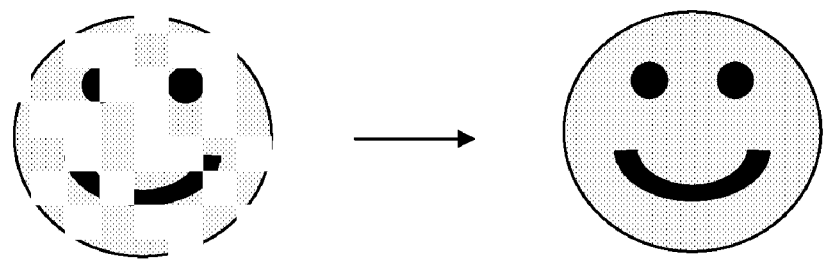
Figure 12C:
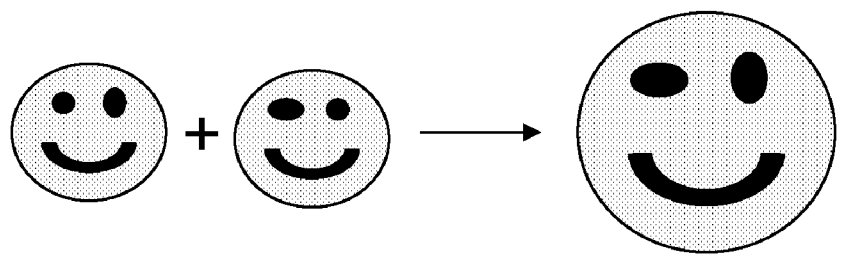

A visual illustration of these advantages is shown in FIGS. 12A-12C. FIG. 12A shows that $L_1$-norm is robust to occlusions, and naturally handles outliers. FIG. 12B shows that $L_1$-norm can further handle smaller model sizes (or sub-sampled model pixels) and thus achieve faster alignment. FIG. 12C illustrates that in an $L_1$-AAM, similar objects are represented very well by the appearance bases.

Figure 11:
FIG. 11 illustrates two examples of poorly aligned model faces.
Figure 11:
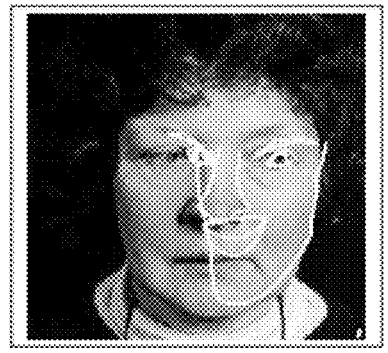

As is explained above in reference to FIG. 4, the active appearance model 25 produces an aligned face 30. However, it is not guaranteed that the produced align face 30 will be an accurate representation of a plausible face (i.e. a realistic example of a true face). Various circumstances, such as a poor starting position of the model face during the alignment process may result poor alignment, and outputting an untrue face as a true aligned face. Examples of poorly aligned model faces are shown in FIG. 11. In both examples of FIG. 11, the model face is aligned to half of the input image, resulting in distorted, untrue face, as indicated by the light face outlined.

In order to avoid outputting an untrue, aligned face, it is presently proposed that a standard AAM machine be modified to incorporate a canonical face classifier to verify the validity of an aligned face produced by align unit 29 before the produced aligned face is sent to the AAM machine's output. It is to be understood that a canonical face classifier is proposed because in the present example the class of object that the AAM machine is trained to process is a human face class. However in general, when an AAM machine is trained to processes an image of any particular class of object, the classifier would be a canonical class classifier trained to determining if the aligned image produced by the align module is a true example of the particular class of object.

Figure 13:
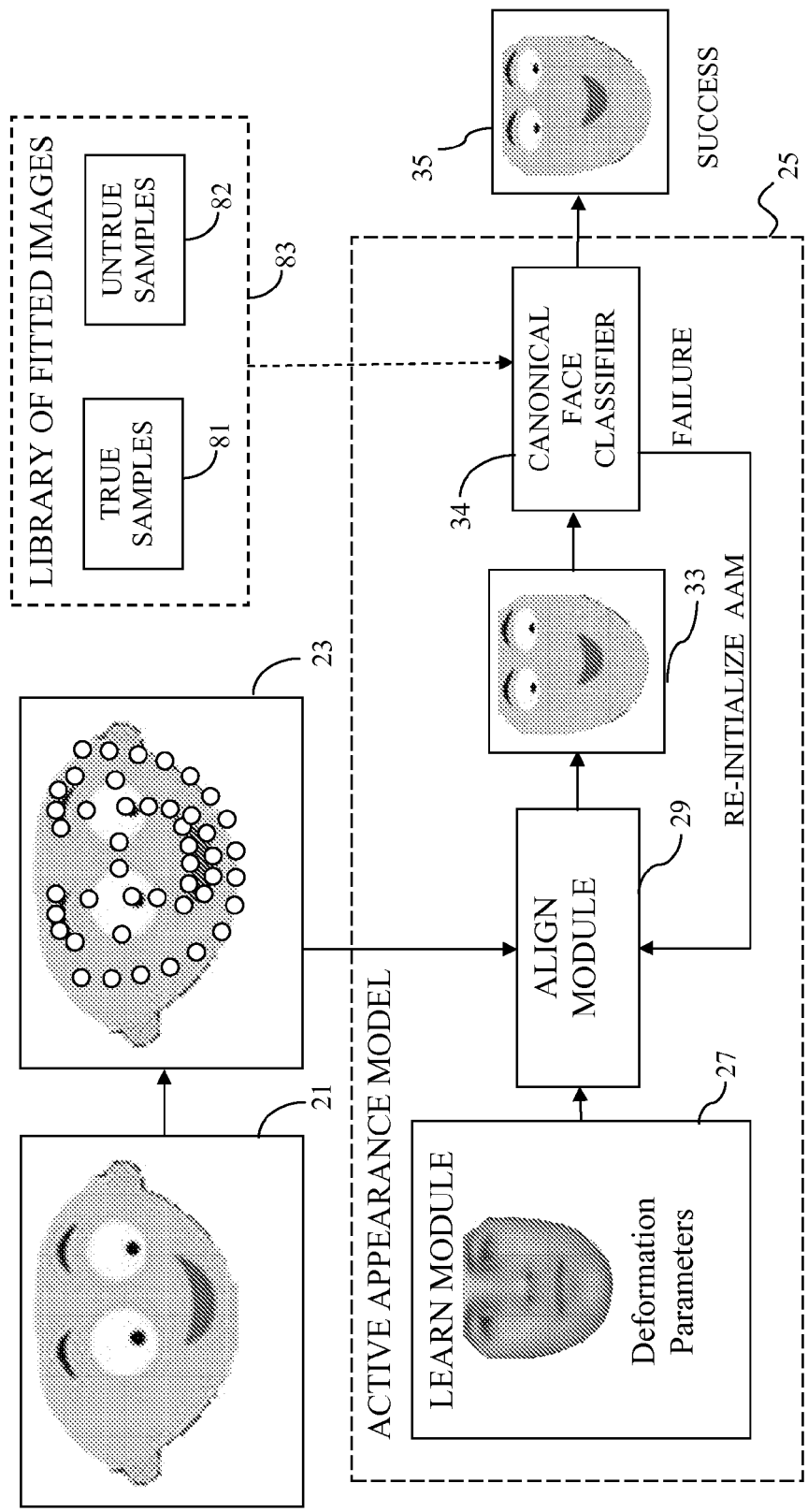
FIG. 13 illustrates an AAM modified to incorporate a canonical face classifier.

With reference to FIG. 13, where all elements similar to those of FIGS. 3 and 4 have similar reference characters and are explained above, the present AAM 25 incorporates a canonical face classifier 34, which receives the aligned face 33 output from align module 29 and classifies it as a true face or an untrue face. If canonical face classifier 34 classifies aligned face 33 as a true face, then the alignment is deemed a success and aligned face 33 is output as output image 35 from AAM 25. If canonical face classifier 34 classifies aligned face 33 as an untrue face, then the alignment is deemed a failure and the AAM alignment is stopped or re-initialized, i.e. the next input image is acquired. For example, if the present AAM 25 is in a system that tracks the movement of a face, and AAM 25 fails to accurately align an initially captured image from a human subject, then the re-initialization of AAM 25 would include capturing a new image of the human subject and re-attempting the alignment process.

As it is known in the art, a classifier, such as canonical face classifier 34, is trained by means of a library 83 having a plurality of true samples 81 (i.e. samples of true faces in the present example) and a plurality of untrue samples 82 (i.e. samples of untrue faces). Ideally, after reviewing the true and untrue samples of library 83, canonical face classifier 34 would identify characteristics by which it may distinguish true faces from untrue faces.

In a preferred embodiment, the training images within library 31 of training images (see FIG. 3) are used in the construction of library 83. That is, the true samples 81 would be comprised of training images from library 31, and the untrue samples 82 would be constructed by introducing distortions into the training images of library 31. A benefit of this approach is that the characteristic features within the training images in library 31 have previously been manually identified and demarcated (see FIG. 2), so that during the training of canonical face classifier 34, it is more likely (or even assured) that canonical face classifier 34 focuses on the identified characteristic features of the particular class of object.

Further preferably, AAM 25 is used in the construction of library 83. In this case, AAM 25 is used to construct an aligned face of each training image within library 31 (or at least of those to which the model face is successfully aligned). This would result in library 83 being a library of fitted faces (i.e. a library of previously aligned faces). Further preferably, true samples 81 are comprised of true fitted faces and untrue samples 82 are comprised of true fitted faces that have been distorted but which maintain the same size and perimeter outline as fitted faces. This would further facilitate the training of canonical face classifier 34 since all the images within the library of fitted faces 83 (both true samples 81 and untrue samples 82) would have the same size and perimeter outline as model face 1 and as aligned face 33 produced by align module 29.

Since in normal operation, canonical face classifier 34 examines aligned face 33 output from align module 29, having trained canonical classifier 34 on a library 83 of fitted faces having the same size and perimeter outline as aligned face 33 further improves the success rate of canonical face classifier 34. That is, the rate at which canonical classifier 34 correctly classifies aligned face 33 as a true face or as an untrue face is improved over training canonical face classifier 34 with a library of unfitted faces.

It is to be understood, however, that any library of suitable training images (not necessarily from library 31), may be used to train canonical face classifier 34. Nonetheless, it is preferred that the library of training images be submitted to AAM 25 to create a library of fitted faces 83. After the created fitted faces have been manually approved as true faces to construct a positive training set 81 of true faces, samples of untrue faces are constructed by introducing distortions into the true faces to construct a negative training set 82 of untrue faces. The two training sets 81 and 82 are combined to create the library of fitted faces 83, which is used to train canonical face classifier 34.

Figure 14:
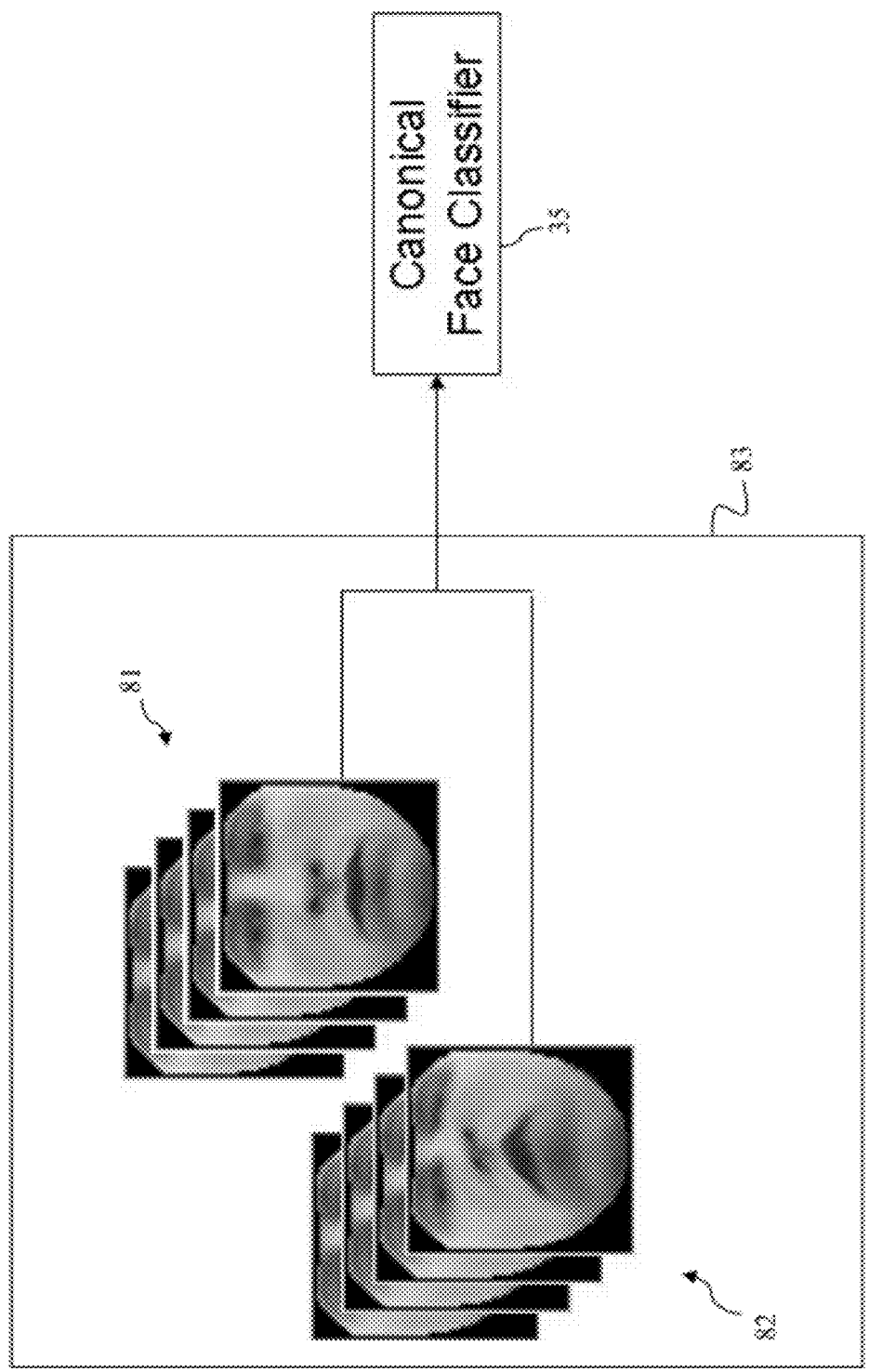
FIG. 14 illustrates a library of training images for training a canonical face classifier.

With reference to FIG. 14, library of fitted faces 83 includes positive training set 81 of true face samples preferably constructed from ground truth, perfectly labeled sample faces, and includes a negative training set 82 of untrue face samples preferably generated by randomly perturbing shape parameters of positive face samples. Further preferably, the perturbations are relative to shape model eigenvalues. Additional untrue samples for negative training set 82 may be created by applying pre-defined translation, scale, and rotation offsets to the positive face samples 81.

It is presently preferred that more negative samples than positive samples be used in the construction of canonical classifier 34. Specifically, a 10:1 ratio of negative to positive training samples is preferred.

Figure 15:
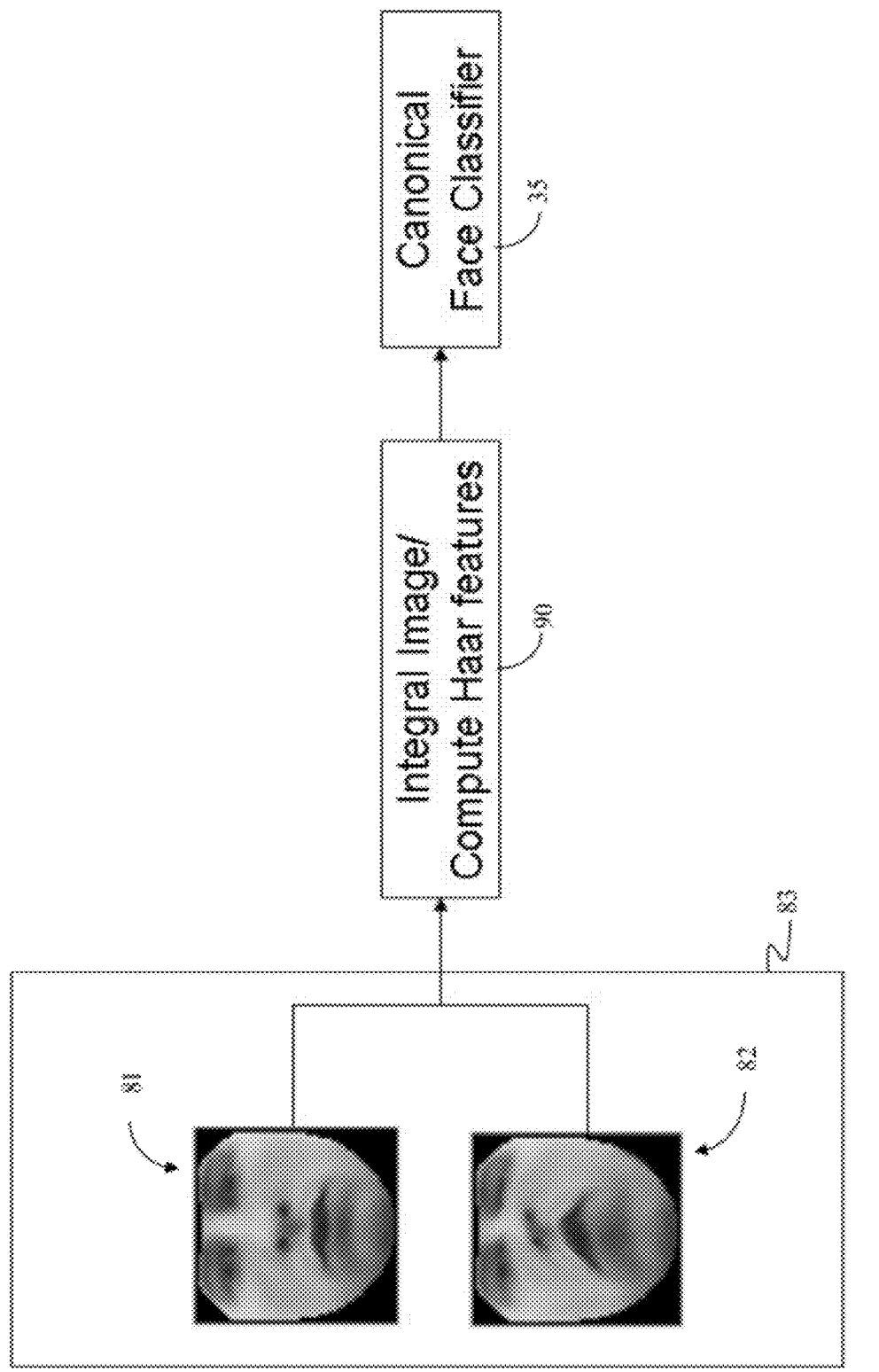
FIG. 15 shows a processing stage for implementing specific types of training techniques for canonical face classifier.

With reference to FIG. 15, where all elements similar to FIGS. 13 and 14 have similar reference characters and are described above, it is presently preferred that a processing stage 90 use Haar features and/or adaboosting, as is known in the art, to train canonical face classifier 34. Alternatively, a support vector machine (SVM) or linear discriminant analysis (LDA) may also be used to create canonical face classifier 34, as it is known in the art. It is to be understood that the specific method of training canonical classifier 34 is not critical to the invention and any technique known in the art of classifier technology and classifier training may be used to train canonical face classifier 34.

It is noted that since aligned face 33 output from align module 29 has a pre-defined shape and size, this facilitates the classification process. That is, the model face 1 (i.e. canonical image) pre-defines the face search size. This improves efficiency since canonical face classifier 34 only need to consider one scale of the image.

In an alternate embodiment, integral image and cascaded weak classifiers may be used to improve efficiency. This approach may make use of the Viola and Jones face detector, known in the art.

Thus by integrating canonical face classifier 34 in an AAM 25, one can achieve a higher reliability than is possible using the typical AAM alignment error techniques.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. An Active Appearance Model machine, comprising:
   a learn module providing a model image of a class of object, said model image being created by combining feature information from an image library of true image samples of said class of object, said learn module further providing a statistical model fitting function defining shape and appearance features of said class of object;
   an input for receiving an input image; and
   an align module optimizing said statistical model fitting function to determine a best fit of said model image and said input image through iterative applications of said statistical model fitting function to produce an aligned image;
   wherein in each of said iterative applications, a shape parameter coefficient p and an appearance parameter coefficient λ within said statistical model fitting function are updated by $L_1$ minimization, and said $L_1$ minimization being defined as:

$$\min_{\Delta p, \Delta \lambda} \left| A\lambda + [SD \quad A] C(\lambda) \begin{bmatrix} \Delta p \\ \Delta \lambda \end{bmatrix} \Delta p - I(p) \right|_{l_1}$$

wherein A=appearance base (i.e. current appearance of the model image within a current iteration), SD=a steepest descent matrix for shape coefficients, C(λ)=coefficient matrix dependent on current appearance parameters, Δp=update in the shape projection coefficients, Δλ=update in the appearance projection coefficients, and I(p)=appearance extracted from the input image based on current shape parameters within a current iteration.

2. The Active Appearance Model machine of claim 1, wherein the appearance basis A is comprised of eigenvectors, and A is also computed by $L_1$-decomposition.

3. The Active Appearance Model machine of claim 1, wherein said class of object is a human face class.

4. The Active Appearance Model machine of claim 1 further including:
   canonical class classifier to determine if said aligned image is a true representation of said class of object; and
   an output for outputting said fitted image only if said canonical class classifier determines that said fitted image is a true representation of said class of object.

5. The Active Appearance Model machine of claim 4, wherein said canonical classifier has access to a library of fitted images (i.e. a library of previously aligned faces), and is trained using said library of fitted images, said library of fitted images being comprised of a positive training set of true fitted images and a negative training set of untrue fitted images.

6. The Active Appearance Model machine of claim 5, wherein said positive training set is comprised of manually verified true images output from said align module as a result of submitting said image library of true image samples of said class of object to said align module.

7. The Active Appearance Module machine of claim 6, wherein said negative training set is comprised of object images from said positive training set to which perturbations have been introduced, wherein said perturbations do not affect the size or perimeter outline of said object images.

8. The Active Appearance Model machine of claim 5, wherein the fitted images within said positive training set and negative training set have characteristic features of said class of object manually identified and demarcated.

9. The Active appearance Model machine of claim 8, wherein the size and perimeter outline of the fitted images within said positive training set and negative training set is the same as the size and perimeter outline of said model image.

10. The Active appearance Model machine of claim 5 wherein the untrue fitted images are constructed from the true fitted images by introducing perturbations related to eigenvalues within said statistical model.

11. The Active appearance Model machine of claim 5 wherein the untrue fitted images are constructed from the true fitted images by applying pre-defined translation, scale, and rotation offsets to the true fitted images, said scale offsets not affecting the size or perimeter outline of the true fitted images.

12. The Active Appearance Model machine of claim 5, wherein the number of untrue fitted images in said negative training set is greater than then number of true fitted images in said positive training set.

13. The Active Appearance Model machine of claim 12, wherein there is a 10:1 ratio in the number of images in said negative training set to the number of images in said positive training set.

14. An Active Appearance Model machine, comprising:
   a learn module providing a model image of a class of object, said model image being created by combining feature information from an image library of true image samples of said class of object, said learn module further providing a statistical model fitting function defining shape and appearance features of said class of object;
   an input for receiving an input image;
   an align module optimizing said statistical model fitting function to determine a best fit of said model image and said input image through iterative applications of said statistical model fitting function to produce an aligned image;
   canonical class classifier to determine if said aligned image is a true representation of said class of object; and
   an output for outputting said aligned image only if said canonical class classifier determines that said aligned image is a true representation of said class of object.

15. The Active Appearance Model machine of claim 14, wherein said canonical classifier has access to a library of fitted images (i.e. a library of previously aligned faces), and is trained using said library of fitted images, said library of fitted images comprised of a positive training set of true fitted images and a negative training set of untrue fitted images.

16. The Active Appearance Model machine of claim 15, wherein said positive training set is comprised of manually verified true images output from said align module as a result of submitting said image library of true image samples of said class of object to said align module.

17. The Active Appearance Module machine of claim 16, wherein said negative training set is comprised of object images from said positive training set to which perturbations have been introduced, wherein said perturbations do not affect the size or perimeter outline of said object images.

18. The Active Appearance Model machine of claim 15, wherein the fitted images within said positive training set and negative training set have characteristic features of said class of object manually identified and demarcated.

19. The Active Appearance Model machine of claim 18, wherein the size and perimeter outline of the fitted images within said positive training set and negative training set are the same as the size and perimeter outline of said model image.

20. The Active Appearance Model machine of claim 15 wherein the untrue fitted images are constructed from the true fitted images by introducing perturbations related to eigenvalues within said statistical model.

21. The Active Appearance Model machine of claim 15 wherein the untrue fitted images are constructed from the true fitted images by applying pre-defined translation, scale, and rotation offsets to the true fitted images, said scale offsets not affecting the size or perimeter outline of the true fitted images.

22. The Active Appearance Model machine of claim 15, wherein there is a 10:1 ratio in the number of images in said negative training set to the number of images in said positive training set.

23. The Active Appearance Model machine of claim 14, wherein:
   said align module applies $L_1$ minimization to compute parameter updates for said statistical model fitting function; and
   in each of said iterative applications, a shape parameter coefficient p and an appearance parameter coefficient $\lambda$ are updated, and said $L_1$ minimization is defined as:

$$\min_{\Delta p, \Delta \lambda} \left| A\lambda + [SD \ A] C(\lambda) \begin{bmatrix} \Delta p \\ \Delta \lambda \end{bmatrix} \Delta p - I(p) \right|_{l_1}$$

wherein A=appearance base (i.e. current appearance of the model image within a current iteration); SD=a steepest descent matrix for shape coefficients; $C(\lambda)$=coefficient matrix dependent on current appearance parameters; $\Delta p$=update in the shape projection coefficients; $\Delta \lambda$=update in the appearance projection coefficients; and I(p)=appearance extracted from the input image based on current shape parameters.

24. The Active Appearance Model machine of claim 23, wherein the appearance basis A is computed by $L_1$-decomposition.

25. The Active Appearance Model machine of claim 14, wherein said class of object is a human face.

* * * * *